Aug. 29, 1967  T. L. HUNTER  3,338,086
MULTI-DIRECTION FORCE CLAMP
Filed March 29, 1965  2 Sheets-Sheet 1
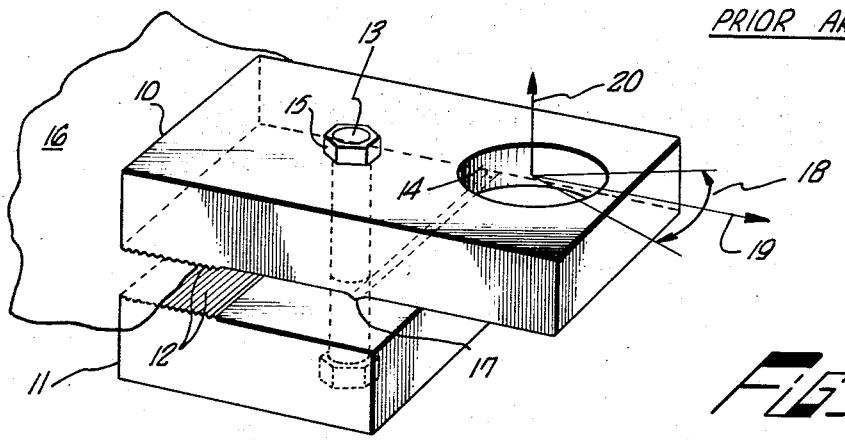
PRIOR ART
FIG_1_
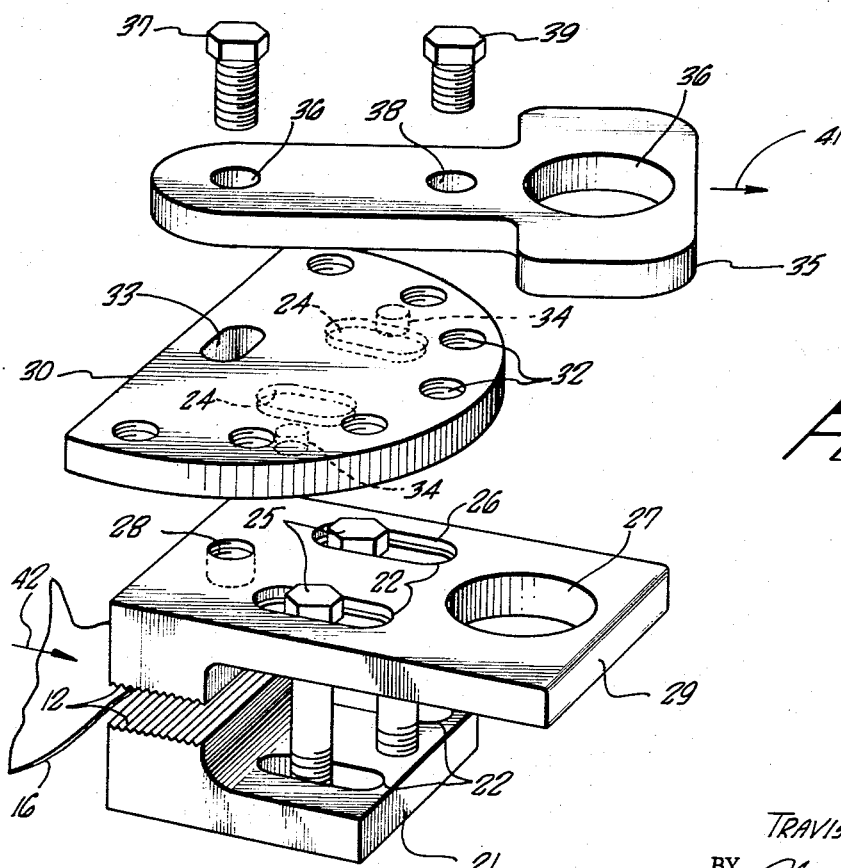
FIG_2_
INVENTOR.
TRAVIS L. HUNTER
BY
Christie, Parker & Hale
ATTORNEYS.

Aug. 29, 1967 T. L. HUNTER 3,338,086
MULTI-DIRECTION FORCE CLAMP
Filed March 29, 1965 2 Sheets-Sheet 2

INVENTOR.
TRAVIS L. HUNTER
BY
Christie, Parker + Hale
ATTORNEYS.

United States Patent Office 3,338,086
Patented Aug. 29, 1967

3,338,086
MULTI-DIRECTION FORCE CLAMP
Travis L. Hunter, 5002 Persimmon Ave.,
Temple City, Calif. 91780
Filed Mar. 29, 1965, Ser. No. 443,498
9 Claims. (Cl. 72—457)

This invention relates in general to a new and improved article of manufacture for holding and manipulating diverse materials while work is being performed on such materials. It relates more particularly to a new and improved clamping device having several interchangeable parts which are capable of cooperating with each other in various combinations to provide numerous and diverse manipulating forces which heretofore have been unavailable by prior art clamping devices.

In the art of material forming, such as metal working to pick one typical example, restoration of preformed parts which have been damaged calls for considerable ingenuity and practical experience in the direction in which forces are to be applied. For example, in the repair of automobiles and trucks, numerous intricate force application problems are encountered.

Such intricate force-applying problems are particularly complex when restoration of so-called "unitized" bodies is being accomplished. The "unitized" body is a strong and rigid reinforced shell, or box-like sheet metal assemblage, to which the engine and power train, etc. are attached. This body alone supports the operating equipment and there is no frame, as such, as is common in the older types of automobile bodies.

The clamp of this invention is useful in automobile bodies and for frame repair. In addition it is particularly useful when applied to restoration of "unitized" bodies. In working on damaged automobiles of either type it is necessary for increased efficiency that each skilled artisan in a body working shop have his own body clamp. I have discovered that higher efficiency can be achieved by artisans in body working shops employing the body clamp of this invention which includes a provision for anchoring one part of the clamp, in combination with a provision for applying working forces to the metal being worked at another part of the clamp. The clamp of this invention is rugged, simple to adjust and operate, and is relatively inexpensive to manufacture. In general, clamps prior to this invention have failed to meet these requirements for the reasons discussed hereinafter.

In prior art clamping devices, the metal to be worked is fastened between gripping jaws which are often formed by bolting two elongated pieces together. At one end of each piece there are gripping surfaces to compressively seize opposite sides of a metal and thus hold the metal during its restoration which results from a force applied to the clamp structure. In the prior art clamp, the single restoring force is generally applied at an opening in the end of one of the gripping jaws substantially opposite the gripping surfaces. This hole receives some force-applying means such as a pulling chain or pressure bar. This single force, it is hoped, will by its application, produce a force on the metal in a direction appropriate to return the damaged material to its preformed condition.

I have discovered that the prior art clamps are limited to applying a force only in the plane of the metal being worked, and are further limited within this force plane to a small arc which is essentially in line with the gripping surfaces. Beyond this small arc any force produces a bending or twisting in the metal because the clamp structure itself acts as a lever arm with respect to a moment or pivot point at the gripping point of the metal being worked. In addition, in the prior art clamping devices, if a force is applied to the opening in the prior art clamp in a plane which is transverse to the plane defined by the metal to be worked, then this transverse force also imparts substantial bending and twisting motion to the metal near the point where the gripping jaws seize the metal.

The above mentioned bending and twisting forces are objectionable because such forces often cause considerably more damage to the already damaged metal, rather than straightening the metal. Of course, in some situations bending and twisting motions are necessary to restore the damaged part to its preformed condition, but up to the advent of this invention these forces were not readily controllable. Thus one serious objection to prior art clamping devices is that there is no provision for applying forces from several different angles and directions without introducing unwanted and objectionable bending and twisting forces to the material being worked.

Another form of prior art clamp is the "twin" clamp which receives a pressure bar and which is often mounted on opposed sides of a piece of metal to be worked. These twin clamps are generally limited in use to straightening an automobile door. These twin clamps include swivel ring connections which allow other than straight in-line forces to be applied to opposite sides of the automobile door. These clamps have proved ineffective for general body work because very often there are areas wherein twin clamps cannot be opposed one from the other. Furthermore it is often impossible to place a hydraulically operated force-applying bar to these clamps even when they can be opposed one from one another because a damaged hump in the metal prevents the pressure bar from being set in place. These twin clamps have also suffered from a further disadvantage, and that disadvantage is similar to those discussed hereinbefore in that they often cause objectionable uncontrolled twisting and bending forces at the gripping jaws rather than delivering a straight pulling or pushing force. Further, these twin clamps are designed to operate together and do not operate satisfactorily when they are used singularly.

The present invention overcomes the foregoing disadvantages of the prior art in that it is a universal clamp having provisions for several multi-direction force-applying means whereby metal being worked may be subjected to several simultaneous and different direction forces. Further, the clamp of this invention includes several similarly aligned pieces which may be interchanged one with another depending upon the particular problem presented by the deformed metal to be straightened. This invention provides forces to the metal substantially free from the objectionable bending or twisting action common to the prior art clamps.

The clamping device of this invention comprises a pair of complementary plates having opposed plane gripping surfaces at one end of each plate, one of said plates being a force plate with a force-applying eye and the remaining plate being a jaw or gripping plate, movable relative to said force plate. Each plate has bored therethrough aligned parallel slots running lengthwise of the plate and away from the gripping surfaces. The force plate, at its outer surface opposite said gripping surface, has additional parallel oversized slots that are counter-sunk for receiving the heads of a pair of threaded clamping bolts, which counter-sunk slots serve to prevent the bolts from turning when mating nuts for the clamping bolts fasten the two plates together so as to apply a compressive force to a piece metal between the gripping surfaces. A threaded vertical hole is bored in the force plate which bore is positioned substantially mid-way between the width of said plate, at the same end immediately above the gripping surfaces. This bore serves as a pivot point. The clamp of this invention further includes a flat semi-circular plate having threaded bored openings approximately equally spaced about the circular arc of the plate and an unthreaded bore located at the mid-point and offset from the edge formed by the diameter of the semi-circular plate. This unthreaded bore in the semi-circular plate is oversized to receive a pivot pin which may take the form of a threaded bolt which threads matched in accordance with the threads of the pivot pin opening in the force plate. The semi-circular plate further includes counter-sunk slot portions for allowing the unsunken part of the heads of the clamping bolts to enter into these counter-sunk slots whereby the plane surfaces of the force and semi-circular plates are flush and continuous when fastened together. Detent pins extending outward from the semi-circular plate are aligned with respect to the parallel slots to be received snugly by the parallel slots located in the force plate, a flat elongated T-shaped member having a large circular opening or "eye," in the T end for receiving a force applying means is also provided. This eye-bar further has two additional smaller holes. One of these holes is at the end opposite the eye and is adapted to receive the aforementioned pivot pin which passes through the elongated eye-bar and the semi-circular plate whereafter it is received in the pivot bore of the force plate. The second smaller hole is located closer to the opening and is aligned with all of the circular arced openings in the semi-circular plate when said pivot pin is in its described pivot bore position. A threaded angular positioning pin passes through the middle hole of the elongated eye-bar member and threads into a selected one of the arc openings in the hemispherical plate which opening affords numerous different angles at which forces may be applied to the clamp structure. Any force applied by the force-applying means to the eye-bar produces a force which is essentially effective at the pivot point immediately above the gripping surfaces; and such a force is substantially free from any bending or twisting of the metal to be worked.

The clamp of the present invention includes, in addition to the foregoing plates, a right angle bracket which also has slot openings and counter-sunk portions aligned with the aforementioned slot openings in the force plate. These slots in the right angle bracket receive the compression bolts. An opening for a pull chain or push bar is present in the remaining part of the right angle bracket, and thus a force plane transverse to the plane of the gripping jaws is provided. This right angle piece includes in the upright portion on opposite sides of the circular opening, two openings for receiving the detent pins of the semi-circular plate so that it and the eye-bar member may also be combined in the clamp of this invention. Also in the right angle piece is a threaded pivot bore opening for receiving the pivot pin which passes through the semi-circular plate and eye-bar described above. Thus when the plates are fastened in the manner described, an extended range of forces of differing angles in a force plane transverse to the plane defined by the gripping surfaces, is available. This transverse force plane in accordance with the principles of this invention is again located by the pivot pin immediately above the gripping surfaces and thus does not introduce any significant bending or twisting forces such as are commonly introduced by the prior art devices.

An alternative embodiment of this invention is provided when the eye-bar is fastened with the right angle bracket piece to provide three distinct and different forces to the metal being worked. This eye-bar further has its pivot pin opening and its angular positioning opening as defined hereinbefore, spaced at the same width as the slots in the force plate so that they can be aligned with these parallel slots. Use of the eye-bar in this manner provides a force plane parallel to the force plane of the force plate, and allows forces to be applied to this parallel plane substantially at right angles to the line of force applied in the force plane.

The foregoing principles and objects of this invention may more readily be understood by reference to the accompanying drawing in which:

FIG. 1 is a perspective view of a prior art clamp;

FIG. 2 is a perspective view of a new and improved clamp embodying the principles of this invention wherein a semi-circular plate is attached to a force plate;

Figure 3:
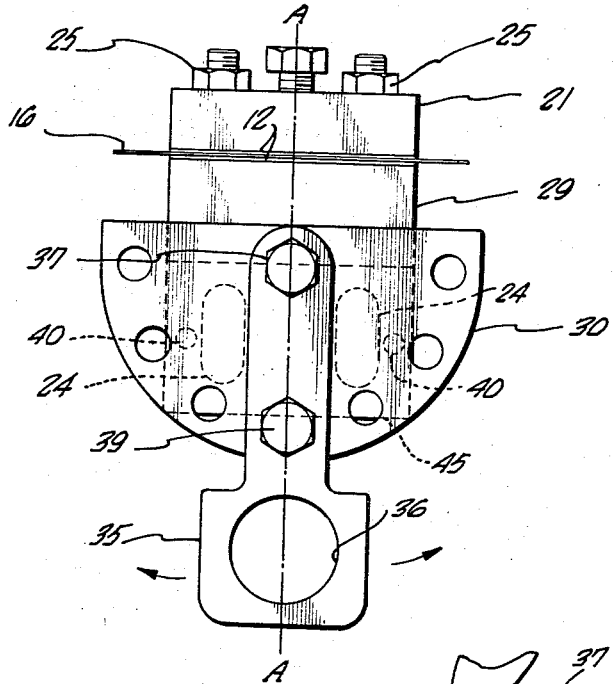
FIG. 3 is a top view of the device of FIG. 2 wherein a right angle bracket and a semi-circular plate is attached to the top of the force plate of FIG. 2.

Turning now to FIG. 1 a typical prior art clamp is shown. This prior art clamp includes two mating pieces 10 and 11 each having at one end a surface of gripping teeth 12 for receiving a piece of deformed metal 16 to be straightened. A clamping bolt 13 and nut assembly 15 are fastened through an opening in the center of the matching plates 10 and 11 in order to apply a compressive force on the gripping teeth 12 when the clamp is in use. A fulcrum 17 is welded or otherwise fastened to the top plate 10 and this fulcrum forces the gripping teeth 12 together with a stronger locking action. In the end of the top plate 10 at the opposite end from gripping teeth 12 is an opening 14 which may receive a force-applying device such as a chain or a compressively loaded bar (not shown). This opening 14 and the gripping teeth 12 combine to apply a force in the direction shown by arrow 19, and when operating in this direction the metal shown as a sheet 16 is subjected to a straight in-line pull.

Also available for a straight in-line pull without any substantially objectionable bending or twisting is a small arc 18 shown by the light lines and the arc arrow 18 intersecting arrow 19. Forces within this arc 18 are satisfactorily transmitted by the clamp, to the metal 16 being worked. In any other pull or push direction, however, such as the direction shown by arrow 20, objectionable twisting and bending forces are applied to the metal being worked.

FIG. 2 shows the new and improved clamp of this invention wherein top and bottom mating plates 29 and 21 are each shown having elongated parallel slots, 22 running lengthwise through a portion of the length of plates 29 and 21. As in the prior art clamp a gripping surface 12 is shown at one end of the clamp of FIG. 2. Two clamping bolts and their associated nut assemblies 25 ride in counter-sunk areas surrounding the parallel slots 23 in the outer surface, or surface opposite the gripping teeth, in plate 29. This plate 29 also has an opening 27 at the end opposite the gripping teeth for receiving a first force-applying means such as a heavy chain or compressively loaded bar.

In the opposite end from the force-applying opening 27 is a threaded opening 28. This threaded opening 28 is a pivot opening in that it provides a center point for transmitting any forces applied to the clamp of FIG. 2 to the gripping surface 12. This threaded pivot opening 28 is located as shown in the approximate center of the width of plate 29 and is immediately above the gripping surface area 12 for reasons to be described in detail hereinafter.

A top plate 30 is shown in FIG. 2 which is substantially semi-circular in shape and has in the curved portion thereof a series of threaded openings 32 and an oversized pivot pin opening 33. The semi-circular plate 30 in its under-surface is equipped with two detent pins 34 which are spaced so that they may be seated into, and received by, the parallel slots 22 in the top plate 29 of FIG. 2. In line with each one of the detent pins 34 on the underside of portion of plate 30 is a counter-sunken area 24. The exposed top portion of clamping bolts 25 is received in the counter-sunken portion 24 in order to provide assurance that plate 30 rides flush on top of plate 29 when clamp of FIG. 2 is assembled.

Also shown in FIG. 2 is an eye-bar 35 having an opening 36 for receiving a second force applying means (not shown). At the opposing end of the eye-bar 35 is a pivot pin opening 36. This pivot pin opening receives the pivot bolt 37 and this pivot bolt 37 is arranged to pass through the pivot pin openings 36 and 33 in members 35 and 30 respectively and to thereafter thread into the pivot pin hole 28 in the outer surface of plate 29. The pivot pin opening 36 in the eye-bar 35 is larger than the diameter of the threaded portion of the pivot pin 37 to allow the eye-bar 35 to swing through this 180° arc of the semi-circular plate 30. Of course the number of openings 32 determine the various angles at which forces may be applied. Seven openings 32 are shown but this number is not to be taken as limiting. Further, the semi-circular plate might assume other shapes in which holes such as 32 form force lines with the pivot pin opening 33 without departing from the principles of this invention.

Located closer to the receiving opening 36 in eye-bar 35 is an angular positioning hole 38 which is larger in diameter than the threaded portion of an angular positioning pin 39, which angular positioning pin 39 is adapted to mate with a selected one of holes 32 located in the hemispherical plate 30. This angular positioning pin 39 is readily removable so that the eye-membered bar 35 may be adjusted in any of the holes 32 to provide different angles of pull for the clamp of FIG. 2 as desired. Obviously when the clamp of FIG. 2 is assembled and put into use with gripping jaws 12 fastened to a piece of deformed metal 16, the eye-membered bar 35 is available to apply forces at any point along the radii formed by each of the openings 32 and pivot pin opening 33 of the semi-circular plate 30. Inasmuch as this pivot pin opening 33 and the pivot pin 37 are at the center point of the gripping jaw surfaces 12, any force applied along one radius, such as the force shown by arrow 41, actually provides a force that is substantially free of any twisting or bending motion because the force 41 at opening 36 of eye-membered bar 35 is transmitted by bar 35 to the pivot pin 37. This pivot pin 37 is located at the midpoint of the gripping surfaces 12 and thus applies a force having its major application in line with the length of the eye-bar 35 removing substantially all of the bending and twisting forces which are present in the prior art clamp of FIG. 1.

Thus, forces may be applied through 180° of arc without imparting any objectionable bending and twisting to the metal being worked, merely by removing angular positioning pin 39 and re-establishing eye-bar 35 at a different selected one of holes 32. In restoring a damaged piece of metal in accordance with the principles of this invention, the force-applying bar or chain need not be removed for each different direction force, nor is it necessary to remove the clamp from the work and fasten it at a different angle or different spot on the metal as was required in prior art clamps.

An alternative embodiment of the clamp of this invention is shown in the top view of FIG. 3 wherein certain of the plates of FIG. 2 are repeated. Where there is a correspondence in parts, the number designations of each of the figures is the same. For example, in FIG. 3 the semi-circular plate 30 and the eye-bar 35 of FIG. 2 are shown fastened together by the pivot pin 37 and angular positioning bolt 39. Clamping plates 29 and 21 of FIG. 2 are also shown in FIG. 3 which is a top view of the plates 29 and 21 taken from the direction of arrow 42, FIG. 2.

In FIG. 2 the eye-bar 35 and semi-circular plate 30 cooperated to provide forces through a 180° arc in a plane substantially in-line with the metal clamped between gripping surfaces 12. In FIG. 3, however, a right angle bracket plate 45 is attached to plate 29. The semi-circular plate 30 and eye-bar 35 are located in detent pin openings 40 in bracket 45. These named plates cooperate to apply forces in a plane which is transverse to the plane of the metal seized by the gripping surfaces 12. This right angle clap 45 is shown in more detail by the side elevation of FIG. 4.

Figure 4:
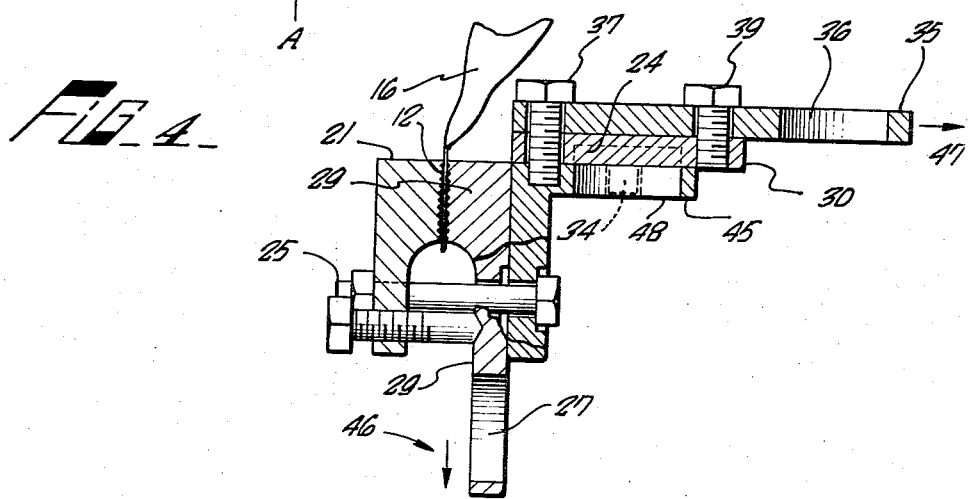
FIG. 4 is a side elevation taken along a plane into the paper at line a—a of FIG. 3.

In FIG. 4 the main clamps 21 and 29 are shown gripping a piece of deformed metal 16. Metal 16 may be deformed in such a manner that both a downward force as shown by arrow 46 and a transverse force as shown by arrow 47 are necessary to restore the metal to its preformed condition. These forces may easily be applied with the new and improved clamp embodying the principles of this invention because as shown in FIG. 4 two force-applying openings 27 and 36 are present in the plates 29 and 35. Either of these openings may receive a force-applying device or an anchoring device such as a chain or bar. An anchoring pipe or chain, if used, may be fastened by some suitable means to a solid structure, such as a jack or floor as is common in the body working art.

Provisions for two force openings such as 27 and 36 in accordance with the principles of this invention, represent a distinct advance over prior art clamps because together these forces can provide controlled multi-direction force patterns to the metal being worked. Of course, one opening such as 27 can be anchored and active forces, represented by arrow 47, may be applied to opening 36. The semi-circular plate 30 provides advantages heretofore unknown by prior art clamps in this particular application, because it is often necessary to vary the direction of force 47. For example, force 47 may have to be adjusted slightly in one direction or the other to compensate for the particular intricate bend in the metal 16, and this compensation is readily available with the clamp of FIG. 3. This compensation is afforded by eye-bar 35 with removable angular positioning pin 39. By changing the location of pin 39, the force represented by arrow 47 may assume many different locations within the plane transverse to that of force 46.

In some applications, these different angle forces will not be needed, and when this situation arises the eye-bar 35 and the semi-circular plate 30 do not have to be placed on the upper surface of right angle bracket 45 because the right angle bracket 45 also has a force-applying opening 48. Forces applied in the direction of arrow 47 and the forces applied in the direction of arrow 46 all are effective essentially at the center of the gripping surfaces 12. Thus, in accordance with the principles of this invention, a multi-direction force clamp is provided which eliminates substantially all objectionable and uncontrolled bending and twisting forces of the prior art clamps. Furthermore, the clamp of this invention is readily capable of being dismantled by removal of a limited number of bolts 35, 37 and 39 and reassembled in a different alternative pull direction whereby the many intricate force application problems in the reforming of damaged preformed metal may be solved quickly and easily, in a straight-forward manner.

Figure 5:
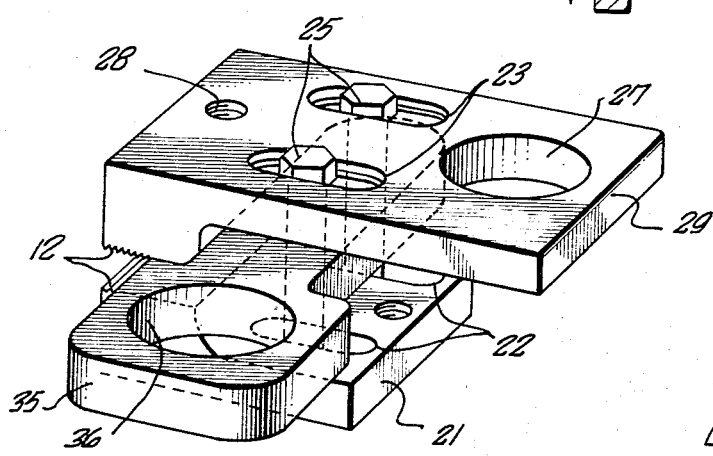
FIG. 5 is an alternative embodiment of this invention wherein an eye-bar is utilized to provide two parallel force planes in accordance with the principles of this invention.

As a typical example of one possibility for reassembling the clamp of this invention, the eye-bar 35 is shown in FIG. 5 attached by the clamping bolts 25 which are located through pivot pin hole 36 and angular position hole 38 of eye-bar 35. Bolts 25 also pass through the parallel slots 22 of plates 29 and 21, and when positioned in these parallel slots 22 the eye-bar 35 may be slid back and forth along the lengthwise section of plates 29 and 21 very similar to the manner in which the right angle bracket 45 and plate 30 may be slid. This operation provides capability for applying a force in a plane parallel to the plane formed by the gripping surfaces 12 on the metal to be worked. Obviously the eye-bar 35 may be pointed with the opening 36 into the paper as another alternative direction for a force application. In addition, the deep-throated off-set of gripping surface areas 12 of plates 29 and 21 allow room for eye-membered bar 35 to be sandwiched between plates 29 and 21. When placed between the plates 29 and 21 a force in a parallel plane lower than the plane of the gripping surface is available.

It is to be understood that the above described arrangement and article of manufacture is illustrative of the principles of this invention. Numerous other arrangements may be devised by those skilled in the art without departing from the spirit and scope of this invention.

What is claimed is:

1. A multi-direction force clamp comprising a pair of complementary plates having opposed plane gripping surfaces at one end of said plates, a right angle bracket, fastening means for securing one side of said bracket with its angle adjacent to the gripping surfaces to said plates and for compressively seizing a piece of material to be worked between said gripping surfaces, a threaded opening bored adjacent to the corner of the angle in the unsecured side of the right angle bracket in line with the plane of the secured side, a flat semi-circular plate having a plurality of threaded bore openings offset from the curved portion of the plate to form a semi-circular arc of openings and an unthreaded bore opening offset at substantially the midpoint of the diameter of the semi-circular plate to form seven equidistant radii with the semi-circular arc of openings, a flat elongated member having two openings, one alignably matched with said midpoint opening and the other matched to align with said semi-circular arc of openings, said elongated member extending beyond said semi-circular plate and adapted to receive a force-applying device once securely fastened in place, a threaded pivot pin for securing said elongated member and said semi-circular plate to said unsecured side of said right angle bracket by passing through openings therethrough and threading into said threaded bore opening in said right angle bracket, a threaded angular positioning means for securing said other opening of said elongated member at a selected one of said plurality of openings forming the semi-circular arc to apply a force at that position in the plane of the semi-circular plate to the metal to be worked, and means for applying a force to one of said complementary plates in a plane transverse to said aforementioned force plane whereby said material is subject to a resultant force substantially effective at said portion of the gripping surface in line with said pivot pin opening.

2. An article of manufacture for reforming damaged preformed materials having a pair of complementary plates with opposed plane gripping surfaces at one end of said plates for receiving a piece of material to be worked, said article comprising a right angle bracket, means for securing one side of said bracket to said plates, an opening in the unsecured side of said right angle bracket to receive a force-applying device for applying a first force, in a plane transverse to the plane of the gripping surfaces, and an opening in one of said complementary plates for receiving a second force-applying device for applying a second force in the plane of the gripping surfaces.

3. An article of manufacture as defined in claim 2 wherein said right angle bracket is moveably positionable with its right angle corner substantially juxtapositioned with the opposed plane gripping surfaces, said right angle bracket having a threaded pivot opening bored adjacent to the corner of the angle through the unsecured side of the bracket in line with the plane of the secured side of the right angle bracket, a pair of detent pin receiving openings bored on opposite sides of the force opening in the unsecured side of the right angle bracket, said article further comprising a third plate having downwardly extended detent pins matched so as to be received by said detent openings in the right angle bracket, an opening in said third plate alignably matched with said pivot opening when said detent pins are received in their openings, means for applying said first force in the plane of said third plate, and means for securing said force-applying means at one of a plurality of angles for imparting a force at that angle in a plane transverse to the plane of the gripping surfaces.

4. An article of manufacture as defined in claim 3 wherein said means associated with said third plate for securing said force-applying means at a selected angle comprises a plurality of substantially equally spaced threaded openings in said third plate arranged in substantially a semi-circular arc of equal radii from said pivot pin opening, an elongated eye-bar member for receiving said first force-applying device, said eye-bar member further having two additional openings alignably matched with the pivot pin and the semi-circular arc openings. and a pivot pin bolt and an angular positioning bolt for securing said eye-bar member at any selected one of the several force angles possible in said transverse force plane.

5. An article of manufacture comprising a pair of complementary plates having opposed plane gripping surfaces at one end of each plate, one of said plates being a force plate with a force-applying eye located at the end opposite its gripping surface and the remaining plate being a jaw gripping plate movable relative to said force plate, each plate having included therethrough a pair of aligned parallel slots running lengthwise of the plate away from said gripping surfaces, a flat semi-circular plate having threaded bore openings approximately equally spaced and offset from the semi-circular curve of the semi-circular plate and an unthreaded bore opening located substantially at the midpoint and offset from the edge forming the diameter of said semi-circular plate, downward extending detent pins spaced on the semi-circular plate to be received in part of the openings of said parallel slots, a pair of compressive bolts for passing through the parallel slots of the jaw and force plates and associated mating nuts for said compressive bolts for compressively seizing material to be worked which is inserted between the gripping surfaces, a flat elongated member having a large circular eye in one end for receiving a force-applying means and a pivot pin opening in the remaining end thereof, said elongated member further having an intermediate opening which is spaced from the pivot bore opening to align with the semi-circular arc openings of the semi-circular plate when the pivot bore opening of the elongated member is aligned with the pivot bore opening in the semi-circular plate, a pivot pin for passing through the pivot bore openings in said elongated member and said semi-circular plate and being received in the pivot bore of said force plate, and an angular positioning pin for passing through the intermediate opening of the elongated bar at a pre-selected one of the circular arc openings of said semi-circular plate for securely fixing said elongated member at an angle with respect to the first mentioned force-applying opening in said force plate whereby a material to be worked is subjected to multi-angle forces.

6. An article of manufacture for reforming damaged preformed materials having a pair of complementary plates with opposed plane gripping surfaces at one end of said plates for receiving a piece of material to be worked, each plate including a pair of bored parallel slots aligned for both plates and running lengthwise of the plates away from the gripping surfaces, a counter-sunk lip portion in the upper surface of one plate surrounding the pair of parallel slots, a pair of compressive bolts passing through the parallel slots in both plates and seated in the counter-sunk portion of the one plate, a threaded pivot pin opening bored in the upper surface of said one plate positioned immediately above and substantially at the midpoint of the gripping surfaces, a third flat plate having an opening bored at the plate's midpoint along one edge to align with the pivot pin opening, a plurality of openings bored in the third plate to form substantially a curved arc about its midpoint opening, detent pins extending downwardly from the third plate to seat into the parallel slots, counter-sunk portions in the underside of the third plate for receiving the exposed portions of the heads of the compressive bolts so that the third plate is contiguous to said one plate, an elongated member adapted to receive a force device and having openings aligned with the midpoint and curved arc openings of the third plate, fastening means for securing the elongated member and the third plate to said one plate, and an angular positioning bolt for securing the elongated member at any selected ones of the curved arc openings.

7. A multi-direction force clamp comprising a pair of complementary plates having opposed plane gripping surfaces, compressive bolts for securing a piece of material to be worked between the gripping surfaces, one of said plates of said pair adapted to receive a first force-applying device in a plane defined by the gripping surfaces, an additional plate combination having a pivot point and means hinged at said point and swingable through selected angles in a semi-circular plane transverse to said first force plane; means for fastening said additional plate combination to said one plate of said pair so that the pivot point is positioned adjacent to the gripping surfaces of said complementary plate pair and the swingable means is secured at one of the selected angles, and a second force device for applying a force to the swingable means when it is so secured.

8. A multi-direction force clamp comprising a pair of complementary plate surfaces having opposed plane gripping surfaces, compression bolt means for seizing a piece of material to be worked between the gripping surfaces, one of said plate structures having a pivot point opening positioned substantially above and at the midpoint of said gripping surfaces, and means associated with said one plate for selectively fastening a force applying device at selected angles in a semi-circular force plane parallel to the plane defined by said gripping surfaces whereby multi-angle forces may be applied to the material to be worked.

9. An article of manufacture for reforming damaged preformed materials having a pair of complementary plates with offset opposed plane gripping surfaces at one end of said plates for relieving a piece of material to be worked, said article comprising in addition a right angle bracket and an eye-bar member, means for securing one side of said bracket to one of said plates and for securing said eye-bar member between said plates adjacent to said offset gripping surfaces, an opening in said one of the pair of complementary plates for receiving a first force applying device for applying a force substantially in a plane parallel to the gripping surfaces and in line with the length of the plane of the complementary pair, an opening in said eye-bar member for receiving a second force applying device for applying a force in a plane defined by said gripping surfaces and substantially transverse in line with the line of the first force, and an opening in the unsecured side of said right angle bracket for applying a third force in a plane transverse to the planes of said first and second forces.

References Cited

UNITED STATES PATENTS

| | | | |
|---|---|---|---|
| 1,880,979 | 10/1932 | Parker | 72—311 |
| 2,608,730 | 9/1952 | Killins | 24—73 |
| 3,131,747 | 5/1964 | Junkins | 72—457 |
| 3,241,352 | 3/1966 | Lincourt | 72—457 |

CHARLES W. LANHAM, *Primary Examiner.*

G. P. CROSBY, *Assistant Examiner.*